United States Patent Office 3,121,574
Patented Feb. 18, 1964

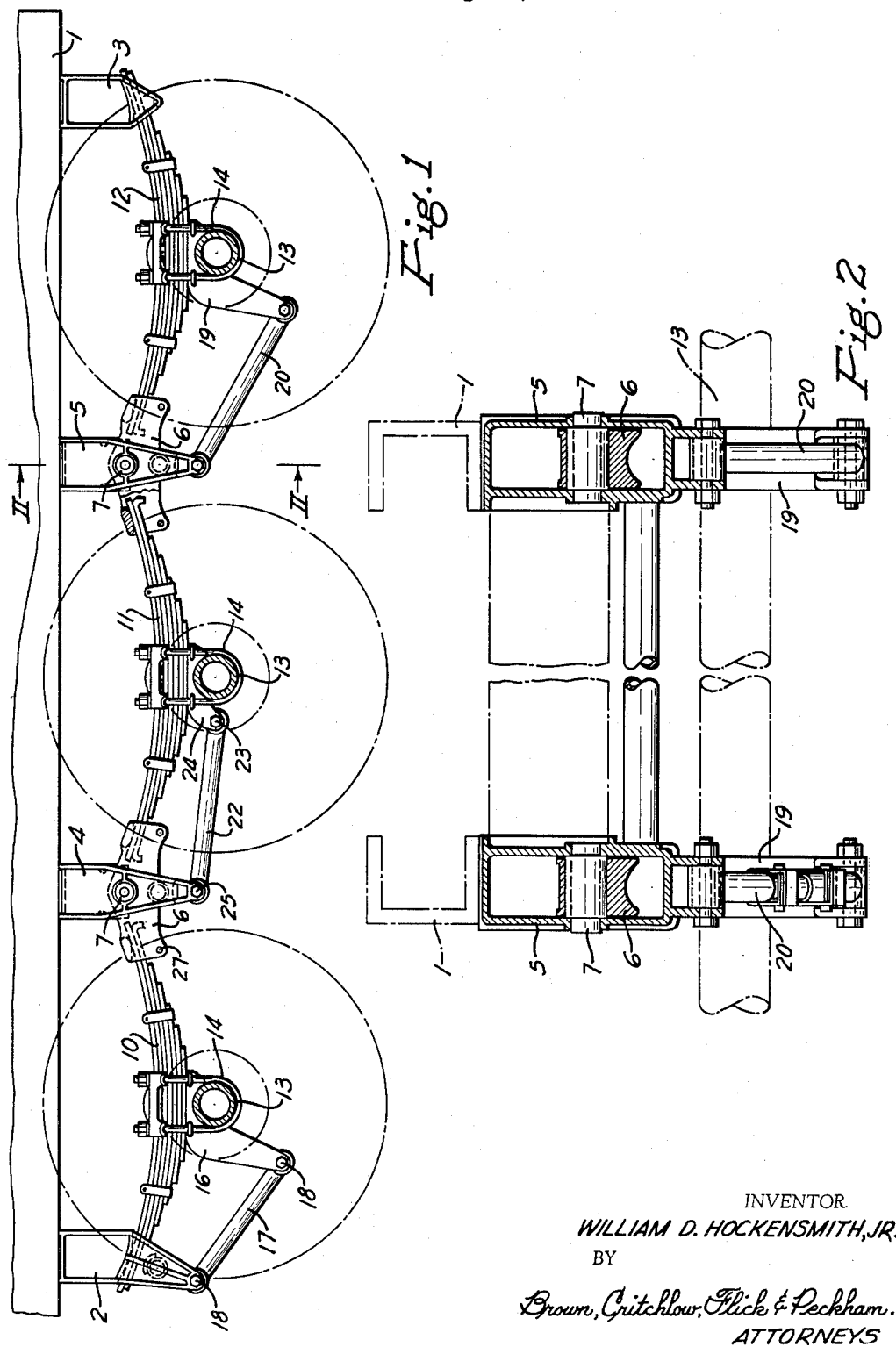

3,121,574
THREE AXLE TRAILER RUNNING GEAR
Wilbur D. Hockensmith, Jr., 628 Cedar St., Irwin, Pa.
Filed Aug. 24, 1962, Ser. No. 219,242
2 Claims. (Cl. 280—104.5)

This invention relates to running gear for truck trailers, and more particularly to a running gear having three tandem axles.

In a common type of spring suspension or running gear two tandem axles are secured beneath the central portions of two tandem pairs of leaf springs, the inner or adjacent ends of which project into rockers mounted in brackets supporting an overlying frame. The front ends of the front springs and the rear ends of the rear springs likewise project into brackets secured to the frame. To hold the axles parallel and in correct position and yet permit them to move up and down, torque arms are pivotally connected to them and some of the brackets. Thus, a pair of torque arms are disposed in front of each axle. The rear ends of the arms are pivotally connected with the axle, and the front ends of the arms are pivotally connected to the brackets in front of the axle. The torque arms have been arranged in two different ways. In one case they have been positioned relatively horizontally directly in front of the respective axles, and in the other case they have been rather steeply inclined from the brackets downward and rearward to the lower ends of spring seat extensions that project down below the axles an appreciable distance. The spring seats are rigidly secured to the axles.

The first arrangement of torque arms has not proved to be satisfactory. When the trailer brakes are applied, the rear ends of the springs rise and their front ends nose dive. Since the inner ends of the springs extend into center rockers, this "winding up" of the springs produces a violent action, followed by a reaction as the springs unwind, which causes the trailer to tend to hop and skip on the highway. If three tandem axles are used, the same undesirable result occurs.

In the other arrangement, where the torque arms usually are inclined about 30° or more, the leverage exerted on the axles by the long spring seats is such that the axles are prevented from rotating and winding up the springs when the brakes are applied. This is still true when three tandem axles are used, but then another problem arises. Since the pair of springs supported by the center axle extend into rockers at both ends and the inner ends of the rockers can tilt up when the center wheels pass over a hump or other obstruction in the road, the center springs can rise about twice as far as the end springs. When that occurs, the inclined torque arms connected with the center axle are likewise swung upward and they move the axle rearwardly so far that the center springs are forced backward in the rockers until they jam into the solid central portions of the rear rocker castings. This can damage the connection between the axle and springs. Because of the dangerous condition thus developed, one of the leading manufacturers of spring suspensions has discontinued selling three axle suspensions with inclined torque arms and long spring seats. On the other hand, customers do not want three axle suspensions with horizontal torque arms, because of the aforementioned spring windup and hopping on the highway when the brakes are applied.

It is among the objects of this invention to provide a three axle running gear which will not hop or skip on the highway when the brakes are applied, and in which the center springs will not move rearwardly appreciably when they rise relative to the other springs in passing over a hump in the road.

In accordance with this invention, three tandem axles are secured to the central portions of three tandem pairs of leaf springs beneath a frame. The front ends of the front springs are received in a pair of hanger brackets secured to the frame, and the rear ends of the rear springs are received in similar hanger brackets. Midway between the front and center axles are a pair of rocker brackets that are fastened to the frame, while a like pair of rocker brackets are secured to the frame midway between the rear and center axles. A rocker is pivotally mounted on a horizontal axis in each of the rocker brackets, from which it projects forward and backward. Each rocker receives the adjacent ends of the springs directly in front and behind it. Rigidly connected to each axle are a pair of spring seats, from each of which a torque arm extends forward to the bracket in front of it. The opposite ends of the arm are pivotally connected to the seat and bracket. The center pair of torque arms are relatively horizontal, but the end pairs of arms are steeply inclined. Thus, the end pairs of spring seats extend downward from the front and rear axles, and the adjoining torque arms are inclined forward and upward from the lower ends of those seats to the brackets in front of them. In this running gear the inclined torque arms prevent the front and rear axles from turning or winding up when the brakes are applied. The front and rear springs therefore restrain the rockers from tilting, and that prevents the center springs from winding up to a harmful extent and from moving vertically as far as before. On the other hand, the substantially horizontal center torque arms do not force the center springs backward appreciably when those springs rise as the center wheels pass over a hump or other obstruction in the road. This avoids the dangerous condition heretofore encountered.

The preferred embodiment of the invention is illustrated in the accompanying drawings, in which:

FIG. 1 is a side view of my running gear, with the tires and brake drums indicated in broken lines; and FIG. 2 is an enlarged fragmentary vertical section taken on the line II—II of FIG. 1, showing the frame and axle in broken lines.

Referring to the drawings, a frame, which may be the frame of a trailer itself or a separate running gear frame to be attached to a trailer, has opposite side members 1 resting on a number of brackets. The brackets may be bolted to the frame or welded to it as shown. There are four of these brackets spaced longitudinally along each side of the frame; a front hanger bracket 2, a rear hanger bracket 3, and two intermediate rocker brackets 4 and 5. Each of these brackets has a passage extending through it lengthwise of the frame, and in the rocker bracket passages there are rockers 6. Each rocker has a solid central portion mounted on a transverse pivot pin 7 extending through it and the surrounding bracket so that the rocker can tilt lengthwise of the frame. The rockers project forward and backward from their supporting hangers and have longitudinal openings in their opposite ends.

There are three tandem leaf springs 10, 11 and 12 at each side of the frame, one spring between each pair of brackets. The ends of the springs extend slidably into the hanger brackets and the rockers to support them and the frame above them. The central portions of each pair of springs are mounted on an axle 13, to which they are rigidly secured by suitable clamps 14. The opposite ends of the three tandem axles carry the usual wheels and brake drums, indicated in broken lines. As described thus far, the running gear is more or less conventional.

The springs do not rest directly on the axles with only a line contact, but are mounted on spring seats rigidly secured to the axles. To hold the front axle in correct position relative to the frame, the front spring seats 16 are connected by torque arms 17 to the lower ends of the front hanger brackets 2. The connections are made by pivot pins 18 through the opposite ends of the arms. One of the arms is adjustable in length in a well known manner as shown in FIG. 2. The rear spring seats 19 are connected in like manner to rear rocker hangers 5 by torque arms 20. To prevent the front and rear axles from turning and tilting or winding up the springs when the brakes are applied, the front and rear spring seats have extensions that project down in front of the adjoining axles and several inches below them. The four torque arms 17 and 20 are rather steeply inclined forward and upward from the seat extensions to the brackets in front of them. With this arrangement the front and rear axles cannot turn appreciably when the brakes are applied. The torque arms could be less steeply inclined, however, if brackets 2 and 5 extended downwardly farther than shown, but that would increase the weight of the heavy brackets and also increase their leverage on their connections to side members 1.

It is a feature of this invention that the torque arms 22 connected with the center axle are not steeply inclined, but are more or less horizontal. Thus, the rear ends of the center torque arms are pivotally connected by pins 23 to the front ends of the center spring seats 24 at points above the bottom of the center axle, preferably about on a level with the center of the axle. The arms extend forward relatively horizontally to the front rocker brackets 4, to the lower ends of which they are pivotally connected by pins 25. If the center axle were used alone, the torque arms connected with it would not prevent center springs 11 from dipping at the front and rising at the back when the brakes are applied. However, in the particular combination shown, such tilting of the center springs is practically eliminated for the following reasons.

As explained before, the front axle cannot rotate, upon application of the brakes, and raise the rear ends of front springs 10. Therefore, the rear ends of those springs will prevent the front rockers 6 from being tilted very far by the center springs because the bolts 27 across the front ends of the rockers will engage the under sides of the front springs and limit the tilting. At the same time, the front ends of rear springs 12 will oppose tilting of the front ends of the rear rockers upwardly by the center springs. The result is that windup of the center spings is held to a minimum and the peviously described violent action occurring heretofore when horizontal torque arms were used is avoided. This desirable result is obtained without using a construction in which the center springs could be jammed back into the rear rockers when the wheels on the center axle travel over a hump in the road, a curb, a railroad rail or other obstruction. That dangerous condition does not develop in this running gear because the restrained rockers 6 prevent the center springs from rising as far as formerly, and because the center torque arms 22 are so nearly horizontal and at such a level that they do not move the center axle rearwardly to any extent, if at all, when the axle is forced upward. In other words, the arms allow the center springs to rise in practically a straight vertical line.

It will be seen that with the three axle running gear disclosed herein the trailer can be stopped without the wheels hopping and skipping along the pavement, and yet the center wheels can move up and down relative to the end wheels without the danger of the center springs being forced into the rear rockers and possibly damaging the connections between the springs and the center axle.

In accordance with the provisions of the patent statutes, I have explained the principle of my invention and have illustrated and described what I now consider to represent its best embodiment. However, I desire to have it understood that, within the scope of the appended claims, the invention may be practiced otherwise than illustrated and described.

I claim:

1. A truck trailer running gear, comprising a frame having spaced sides, three tandem leaf springs beneath each side of the frame, an axle extending transversely of the frame beneath the central portions of each pair of springs, means securing each axle to the springs above it, a pair of hanger brackets receiving the front ends of the front springs and secured to said frame, a pair of hanger brackets receiving the rear ends of the rear springs and secured to the frame, a pair of rocker brackets secured to the frame midway between the front and center axles, a pair of rocker brackets secured to the frame midway between the rear and center axles, a rocker pivotally mounted on a horizontal axis in each of said rocker brackets and projecting forward and backward therefrom, each rocker receiving the adjacent ends of the springs directly in front and behind it, whereby said frame is supported through said brackets and rockers on the springs, a central pair of spring seats rigidly connected to the center axle, a relatively horizontal torque arm in front of each spring seat substantially at the level of the center axle, means pivotally connecting the opposite ends of the arms on horizontal axes to said seats and the lower ends of the rocker brackets in front of the center axle, end pairs of spring seats rigidly connected to the front and rear axles and extending downward therefrom, a torque arm in front of each of said end spring seats and inclined upward and forward therefrom, and means pivotally connecting the opposite ends of said inclined arms on horizontal axes to the lower ends of the adjoining end spring seats and the brackets in front of them.

2. A truck trailer running gear, comprising a frame having spaced sides, three tandem leaf springs beneath each side of the frame, an axle extending transversely of the frame beneath the central portions of each pair of springs, means securing each axle to the springs above it, a pair of hanger brackets receiving the front ends of the front springs and secured to said frame, a pair of hanger brackets receiving the rear ends of the rear springs and secured to the frame, a pair of rocker brackets secured to the frame midway between the front and center axles, a pair of rocker brackets secured to the frame midway between the rear and center axles, a rocker pivotally mounted on a horizontal axis in each of said rocker brackets and projecting forward and backward therefrom, each rocker receiving the adjacent ends of the springs directly in front and behind it, whereby said frame is supported through said brackets and rockers on the springs, a pair of spring seats rigidly connected to each axle, a torque arm extending forward from each spring seat to the bracket in front of it, and means pivotally connecting the opposite ends of the arm on horizontal axes to said seat and bracket, the center pair of torque arms being relatively horizontal and located substantially at the level of the center axle, the end pairs of spring seats extending downward from the front and rear axles and below the level of the lower ends of the said brackets, and the end pairs of torque arms being steeply inclined forward and upward from the lower ends of said end spring seats to the brackets in front of them.

References Cited in the file of this patent

UNITED STATES PATENTS

| | | |
|---|---|---|
| 2,823,926 | Stover | Feb. 8, 1958 |
| 2,841,414 | Ward | July 1, 1958 |
| 2,900,197 | Hutchens | Aug. 18, 1959 |